Sept. 27, 1927.

A. H. KINZEL 1,643,561

GASKET

Filed Nov. 25, 1925

INVENTOR.
ARCH H. KINZEL.

BY

ATTORNEY.

Patented Sept. 27, 1927.

1,643,561

UNITED STATES PATENT OFFICE.

ARCH H. KINZEL, OF AKRON, OHIO.

GASKET.

Application filed November 25, 1925. Serial No. 71,368.

This invention relates to gaskets for use on pipe joints, cylinder heads, etc., and particularly to that type of gasket comprising a resilient, annular, corrugated, metallic disc, usually of ductile, non-corrosive material such as copper, and having packing material such as strips, strands or cords of asbestos secured in the troughs of the corrugations either on one or both sides of said disc.

Heretofore, gaskets of the general type referred to above have been obtainable on the market and have been adopted widely in various industries in which they have met with considerable success. In installations, however, where the joints packed are frequently broken, such as for dismantling a system at one place and reconstructing it at another, as is the custom in installations at oil wells, it has been found that the glue or other adhesive employed for securing the strips of packing in the troughs of the disc deteriorates so that upon breaking the joint, the packing strips fall out of the troughs in the disc and reuse of the gaskets is impossible. This has necessitated replacement of gaskets in large numbers in such types of installations as mentioned above, a replacement giving rise to an item of expense of no inconsiderable amount.

The chief object of the invention is to improve upon gaskets as described above in such a manner as to render them capable of repeated reuse without sacrificing the many advantages thereof due to their excellent packing qualities provided by the resilient corrugations and their ability to yield under pressure to compact the strips of packing material in the troughs.

Particularly it is a purpose of the invention to provide a soft yieldable covering, preferably of the same material as the metallic disc, e. g. ductile metal such as copper, adapted to overlie the troughs of the disc and to thus retain the packing strands therein and also to protect them from the direct action of fluids thereon, whereby the gasket will be suitable for repeated reuse.

The foregoing and other objects are obtained by the construction illustrated in the accompanying drawings and described below. It is to be understood that the invention is not limited to the specific form thereof shown and described.

Figure 1:
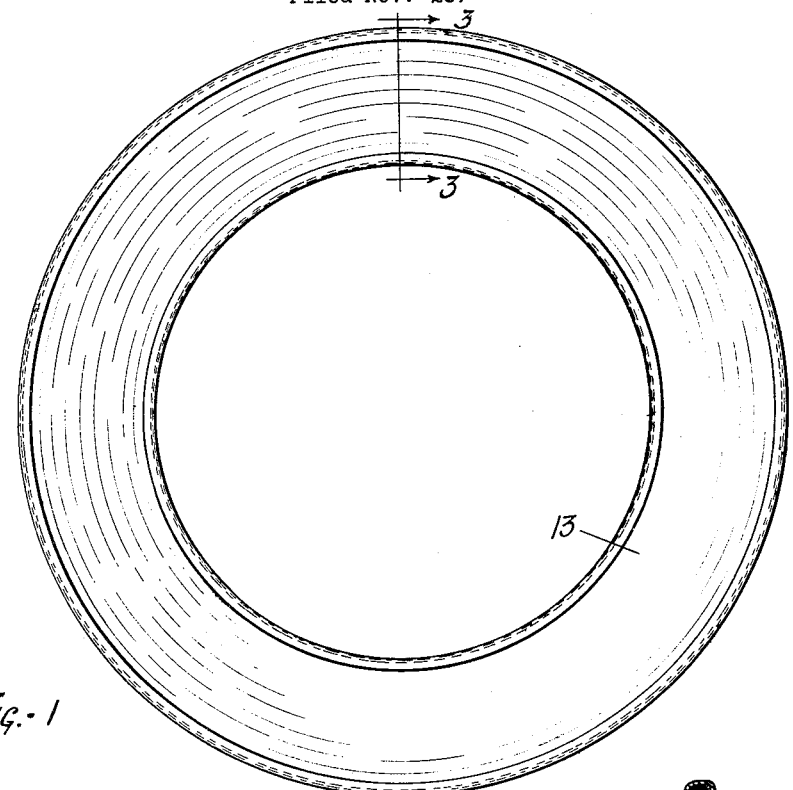
Figure 1 is a plan of a gasket embodying the invention.
Figure 2:
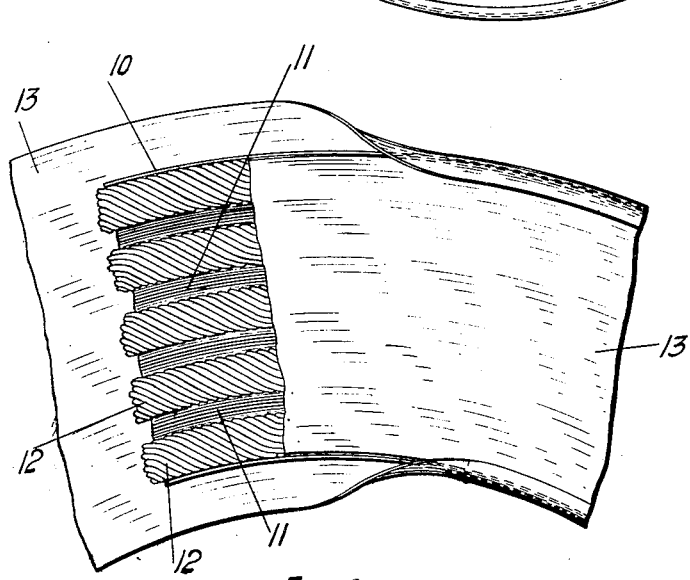
Figure 2 is an enlarged plan of a portion thereof, partly broken away to illustrate the interior construction.
Figure 3:
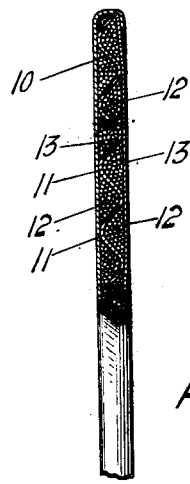
Figure 3 is an enlarged section on line 3—3 of Figure 1.

Referring to the drawings, 10 designates an annular, corrugated disc, preferably of ductile metal such as copper and preferably with circumferential corrugations 11, 11 therein and having strands 12, 12 of packing material such as asbestos arranged in the troughs of the corrugations either on one or both sides thereof. So far, the gasket, as described above, is similar to gaskets now obtainable on the market with the exception that the strands 12 preferably are secured in the troughs by adhesives to facilitate assembly of the gasket.

According to the present invention, the strands 12 are confined in the troughs by means of annular sheets 13, 13 of flexible, yieldable material, e. g. ductile metal such as copper, which may be secured in any suitable manner onto disc 10 to cover the troughs therein. As shown, the plates 13 are overlapped at the inner and outer edges of the disc 10, but they may be overlapped only at one edge or secured in various other ways to disc 10, provided they overlie the troughs therein.

It will appear from the foregoing that the sheets 13 serve both as means for securing the strips 11 in the packing and also as means for protecting them against deterioration, yet in no wise affecting the packing qualities of the gasket. The resulting gasket is thus rendered capable of repeated reuse, an advantage of great value.

Modifications of the invention may be resorted to without departing from the spirit thereof or the scope of the appended claims.

What is claimed is:

1. A gasket, comprising a resilient, corrugated, metallic disc having strands of packing material in the troughs of the corrugations to provide a substantially flat surface, and a sheet of ductile metal secured on said disc so as to overlie said troughs and resting upon the crests of the corrugations to confine said strands therein.

2. A gasket, comprising a resilient, corrugated, metallic disc having strands of packing material in the troughs of the corrugations on both sides thereof, and having a protective covering of material secured thereon on both sides thereof so as to confine said strands in said troughs.

ARCH H. KINZEL.